(12) United States Patent
Fyfe et al.

(10) Patent No.: US 11,206,812 B2
(45) Date of Patent: Dec. 28, 2021

(54) FLEXIBLE PADS AND SHIELD SYSTEMS

(71) Applicant: Design Blue Limited, Brighton (GB)

(72) Inventors: James Fyfe, Brighton (GB); Mark Muenchinger, Brighton (GB)

(73) Assignee: Design Blue Limited, Brighton (GB)

( * ) Notice: Subject to any disclaimer, the term of this patent is extended or adjusted under 35 U.S.C. 154(b) by 0 days.

(21) Appl. No.: 14/912,803

(22) PCT Filed: Sep. 29, 2014

(86) PCT No.: PCT/GB2014/052936
§ 371 (c)(1),
(2) Date: Feb. 18, 2016

(87) PCT Pub. No.: WO2015/044687
PCT Pub. Date: Apr. 2, 2015

(65) Prior Publication Data
US 2016/0198681 A1    Jul. 14, 2016

(30) Foreign Application Priority Data
Sep. 28, 2013 (GB) ..................... 1317225

(51) Int. Cl.
*A01K 13/00* (2006.01)
*A41D 13/015* (2006.01)
(Continued)

(52) U.S. Cl.
CPC .......... *A01K 13/006* (2013.01); *A41D 13/015* (2013.01); *A42B 3/062* (2013.01);
(Continued)

(58) Field of Classification Search
CPC .. A42B 3/00; A42B 00/00; A42B 3/12; A42B 3/062–065; A42B 3/124–128;
(Continued)

(56) References Cited

U.S. PATENT DOCUMENTS 3,425,061 A    2/1969  Webb
3,999,220 A   12/1976  Keltner
(Continued)

FOREIGN PATENT DOCUMENTS

BE    836581     1/1976
GB   2467646    11/2010
(Continued)

OTHER PUBLICATIONS

United Kingdom Search Report dated Mar. 25, 2014.
International Search Report dated May 20, 2015.

*Primary Examiner* — Maria V Ewald
*Assistant Examiner* — Daniel P Dillon
(74) *Attorney, Agent, or Firm* — Ryan T. Grace; Advent, LLP

(57) ABSTRACT

A shield system for protecting a curved object is described. The system comprises at least one flexible pad. The at least one flexible pad comprises a spacing ridge (7) projecting at an angle from a first major surface (3) of the pad for providing a spacing between the first major surface and a support ridge (9) projecting from the first major surface and extending transverse to the spacing ridge. The support ridge comprises a flexure region (11) adapted to unbend in the event that the pad is curved about an axis aligned with the spacing ridge to inhibit strain in the support ridge from causing deflection of the spacing ridge.

14 Claims, 7 Drawing Sheets plan view side view B-B

(51) Int. Cl.
 *A42B 3/06* (2006.01)
 *A42B 3/12* (2006.01)
 *A45C 11/00* (2006.01)
 *B65D 81/02* (2006.01)

(52) U.S. Cl.
 CPC .............. *A42B 3/124* (2013.01); *A42B 3/125* (2013.01); *A45C 11/00* (2013.01); *B65D 81/02* (2013.01); *A45C 2011/002* (2013.01); *A45C 2011/003* (2013.01)

(58) Field of Classification Search
 CPC .......... A41D 13/00; A41D 13/015–018; A41D 00/00; A41D 13/05; B65D 81/02; F16F 7/00; A63B 00/00
 USPC ......................................................... 428/119
 See application file for complete search history.

(56) References Cited

U.S. PATENT DOCUMENTS

| | | | | |
|---|---|---|---|---|
| 5,524,641 | A | * | 6/1996 | Battaglia ............ A41D 13/0153 128/846 |
| 9,629,397 | B2 | * | 4/2017 | Toronjo ................... A42B 1/22 |
| 2003/0088900 | A1 | | 5/2003 | Cho |
| 2009/0057357 | A1 | * | 3/2009 | Rohrbach ................ A45F 5/00 224/222 |
| 2010/0104814 | A1 | * | 4/2010 | Richardson ........... A45C 11/00 428/156 |
| 2012/0030850 | A1 | | 2/2012 | Wood |
| 2012/0174282 | A1 | * | 7/2012 | Newton ............. A41D 13/0015 2/69 |

FOREIGN PATENT DOCUMENTS

| | | |
|---|---|---|
| WO | 98/46095 | 10/1998 |
| WO | 2003/055339 | 7/2003 |
| WO | 2005/000966 | 1/2005 |
| WO | 2015044687 | 4/2015 |

* cited by examiner plan view side view
B-B plan view side view perspective view plan view side view perspective view plan view side view

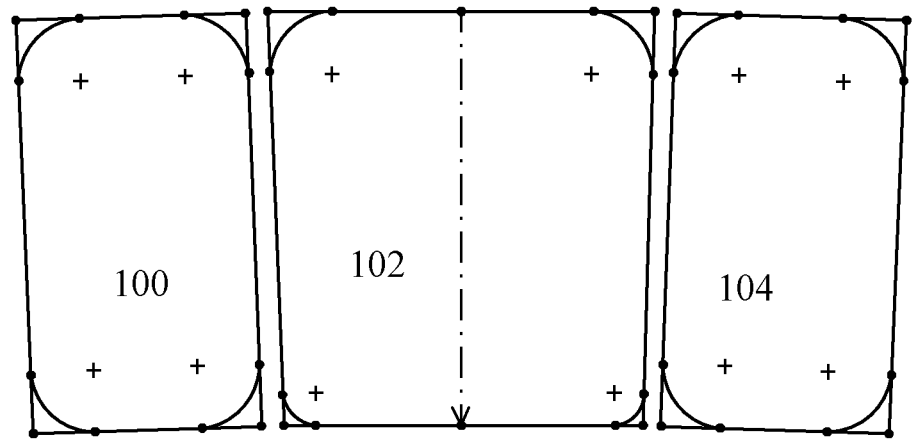
Fig. 7
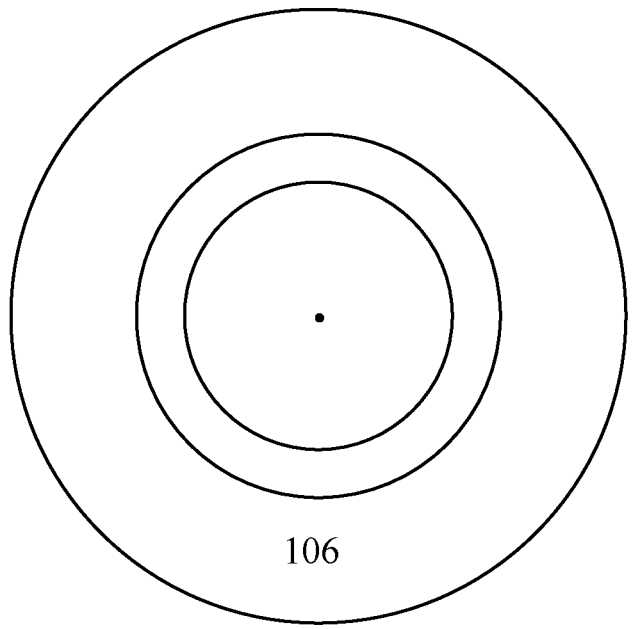
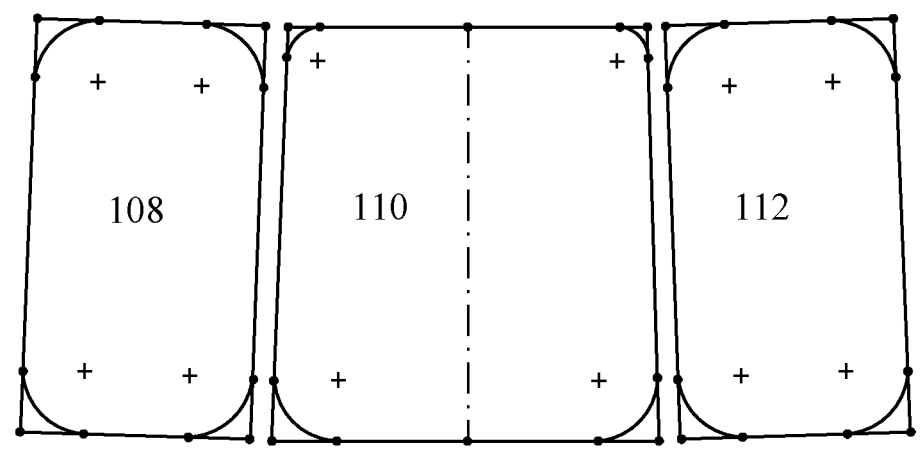

FLEXIBLE PADS AND SHIELD SYSTEMS

The present disclosure relates to impact protection apparatus, and more particularly to flexible pads adapted to be inserted into shield systems for shielding curved objects, examples of shield systems include armour such as limb protectors, for example shoulder pads and knee pads, and head gear such as helmets Typically shields to protect against impacts comprise rigid structures adapted to reduce the pressure associated with an impact by increasing the cross section over which the force of the impact is distributed. In addition compressible materials, such as foams, may be used to line shields. These act to reduce the acceleration experienced by the shielded object as a result of an impact. For example, compression of a helmet liner may absorb some energy that would otherwise be transmitted to the head of a wearer.

It may be preferred for parts of a shield to be replaced after a period of use, for example if a shield is subjected to an impact, part or all of the shield can be replaced to ensure that the protection offered by the shield is not reduced. Accordingly, removable replaceable pads may be used in shield systems.

Where a shield system is used for shielding a curved object, and/or the shell of the shield itself is curved, it may be desired to conform a flat pad to the shell. However, the deformation characteristics of a pad may be modified by the compressive or tensile stresses under which it is placed in order to conform it to a curved object and/or to a shield.

Aspects and examples of the disclosure provide flexible pads and shield systems.

Suitable materials include elastic materials such as polymeric elastomers and foam materials, for example polymeric foams. Examples of suitable polymeric foams include phenolic resin foams, polystyrene foams, polyurethane foams, polyethylene foams, polyvinylchloride foams, polyvinylacetate foams, polyester foams, polyether foams, and foam rubber.

Another group of materials suitable for use in connection with the flexible pad of the present disclosure corresponds to rate-sensitive materials. In the present disclosure, a rate-sensitive material is defined as a non-Newtonian material (i.e. having a non-Newtonian stress-strain profile) that exhibits a resistive load under deformation which increases with the rate of deformation. Rate-sensitive materials, which include shear thickening and dilatant materials, are capable of decelerating impact associated energies. Suitable rate-sensitive materials for use with the flexible pad of the present disclosure include rate-sensitive polyurethane foams, for example microcellular open-cell polyurethane foams, for example those available from Rogers Corporation under the brand names PORON(R) and PORON XRD(R).

In an embodiment, the flexible pad of the disclosure is formed from a rate-sensitive material which comprises a dilatant. For example, the rate-sensitive material is formed of a composite material comprising i) a first polymer-based material and ii) a second polymer-based material, different from i), which exhibits dilatancy in the absence of i), wherein the second polymer-based material ii) is entrapped in a matrix of the first polymer-based material i), the composite material being unfoamed or foamed, and, when unfoamed being preparable by incorporating the second polymer-based material ii) with the first polymer-based material i) prior to formation of the matrix, and when foamed, being preparable by incorporating the second polymer-based material ii) with the first polymer-based material i) prior to foaming. For example, the matrix of the first polymer-based material i) is a solid matrix, i.e. a matrix material which retains its own boundaries without need of a container.

The composite material may be suitable for use in the flexible pad of the present disclosure without foaming, i.e. it may be unfoamed as such, or it may be produced as a precursor to a composite material which is subsequently to be foamed, i.e. that is foamed after the second polymer-based material ii) has become entrapped in a matrix of the first polymer-based material i).

For example, the first polymer-based material i) and second polymer-based material ii) are in intimate admixture; for example, as attainable by blending i) and ii) together. By blending is meant herein the mixing together of polymer-based material i) and polymer-based material ii) in the semi-molten or molten state to form a composite material wherein the first polymer-based material i) and the second polymer-based material ii) are in intimate admixture. Where the composite material is unfoamed, the first polymer-based material i) and the second polymer-based material ii) are mixed prior to formation of the matrix. Similarly, where the composite material is foamed, the first polymer-based material i) and the second polymer-based material ii) are mixed prior to foaming. Thus, in each case, the second-polymer based material ii) is distributed within the body of a matrix/foam formed from the first polymer-based material ii) in the finished composite material.

The first polymer-based material i) may be one wherein the polymer comprising the first polymer-based material i) comprises ethylene-vinyl acetate (EVA), or an olefin polymer, for example polypropylene, or an ethylene polymer, such as high pressure polyethylene (LDPE), LLDPE or HDPE.

For example, the polymer comprising the first polymer-based material i) comprises an elastomer. While natural elastomers, e.g. latex rubbers, may be used, synthetic elastomers (such as neoprene), more for example synthetic thermoplastic elastomers, such as thermoplastic polyesters, are preferred. Preferred classes of such elastomers include elastomeric polyurethanes and elastomeric EVAs (ethylene/vinyl acetate copolymers), and others, such as silicone rubbers, polyurethanes and EP rubbers, e.g. EPDM rubbers, may be suitable.

Any polymer-based material, different from i), which exhibits dilatancy and can be incorporated into the chosen elastic constituent(s) of first polymer-based material i) may be used as second polymer-based material ii). By a polymer-based material which exhibits dilatancy is meant a material in which the dilatancy is provided by one or more polymers alone or by a combination of one or more polymers together with one or more other components, e.g. finally divided particulate material, viscous fluid, plasticiser, extender or mixtures thereof, and wherein the polymer is the principle component. In one preferred embodiment, the polymer comprising the second polymer-based material ii) is selected from silicone polymers exhibiting dilatant properties. The silicone-based polymer is for example selected from borated siloxane polymers. For example, the dilatant may be selected from filled or unfilled polyborodimethylsiloxanes (PBDMSs) or any number of polymers where PBDMS is a constituent. The dilatancy may be enhanced by the inclusion of other components, such as particulate fillers.

The dilatant may be combined with other components in addition to the components providing the dilatancy, e.g. fillers, plasticisers, colourants, lubricants and thinners. The fillers may be particulate (including microspheres or microballoons), or fibrous, or a mixture of particulate and fibrous.

One class of particular preferred dilatants based on PBDMS comprises the borated silicone-based materials that are marketed under the generic name of silicone bouncing putties and are produced by various manufacturers. These include those by Dow Corning under product catalogue number 3179 and by Wacker GmbH under product numbers M48 and M29. Other companies such as Rhodia, GE Plastics, and ICI have also produced these materials, and other polymer-based dilatant materials having similar dilatancy characteristics, e.g. a similar modulus at low rates of strain and a similar plot of modulus with respect to the applied strain rate.

Particularly suitable materials for forming the flexible pad according to the present disclosure are disclosed in WO 03/055339 and WO 2005/000966.

The composite material described above may be comminuted for ease of handling or for moulding purposes.

Foamed composite materials which may be used for forming the flexible pad according to the present disclosure may be prepared by combining the polymer intended to comprise the first polymer-based material i); the polymeric dilatant intended to comprise the second polymer-based material ii); and a gas, vapour, supercritical liquid, or precursor thereof, such that the dilatant and the gas or vapour are distributed, generally substantially uniformly, throughout the matrix to produce a resiliently compressible material which exhibits a resistive load under deformation which increases with the rate of deformation. One suitable method comprises incorporating a polymer-based dilatant into a foamed synthetic elastomer, for example during the formation of the foam.

An alternative method may comprise incorporating an unfoamed mixture of the first polymer-based material i) and the second polymer-based material ii) in the barrel of an injection moulding machine including means for supplying a pneumatagen thereto; bringing the mixture to an elevated temperature and an elevated pressure such that it is in molten form; supplying a pneumatagen to the barrel; and reducing the pressure of the heated composite material, thereby causing foaming of the composite material. The pressure may be reduced in this process by injecting the composite material into a mould or extruding the composite material, suitably at ambient pressure. Such a process may be operated on a continuous basis. For example, the elevated temperature is from 150° C. to 240° C., for example from 170° C. to 210° C. For example the elevated pressure at which the pneumatagen is injected is from 1600 psi to 2000 psi, for example from 1700 psi to 1900 psi.

A flexible pad comprising the composite according to one embodiment of the present disclosure may also be formed in a mould. For example, a precursor mixture suitable for forming the body may be incorporated in a first mould section, which may then be closed, for example by disposing a second mould section over the precursor mixture, and the precursor mixture may be cured and/or foamed to form the body. By a precursor mixture suitable for forming the body is meant any mixture of components, for example a molten or semi-molten mixture, that may be cured or foamed, for example a molten or semi-molten mixture of the first polymer-based material i) and second polymer-based material ii), and optionally an activating/curing component. Curing of the precursor mixture may be caused by application of suitable pressures or temperatures, and/or by the use of one or more activating components. Foaming, where desired, may be caused by introduction of a pneumatagen, for example a very high pressure gas such as nitrogen, or the use of microspheres comprising a plastic shell which hermetically encapsulate a gas or vapour; and causing the gas or vapour to expand to foam the precursor mixture. The temperatures used in such processes may for example range from 150° C. to 240° C., for example from 170° C. to 200° C. or 190° C. to 210° C. The elevated pressures may for example range from 5000 psi to 12000 psi, for example from 6000 psi to 7000 psi or from 9000 psi to 11000 psi.

Other moulding techniques for preparing the flexible pad according to the present disclosure are well known to the person of skill in the art, as are methods for temporarily or permanently, attaching the liner to the inside surface of a helmet.

In general, the composite material of the invention will exhibit resistance to creep and compression set. A low creep modulus of the composite modulus will be beneficial, but not essential, to imparting resistance to compression set. In some applications it may be preferred to allow the material to have high creep characteristics; for example, for sound insulation purposes.

The pad may comprise composite material comprising a dilatant and the choice and blending ratio of the dilatant in the composite material and, where foamed, the amount of gas or vapour in the composite material, e. g. as indicated by the required density of the composite material, will be determined by the requirements of the shield system in which the composite material is to be employed. In general, the dilatant will form from 5 to 80%, for example 10 to 50%, for example 15 to 40% by volume of the composite, and where foamed, the amount of gas or vapour (in the preferred case where it is a gas) will be such that the gas or vapour content of the composite may be from 20 to 90%, more for example from 30 to 80%, still for example from 40 to 70% by volume. It should be noted that these proportions are excluding the use of any fillers or other additional components.

The pad may be shaped, e. g. extruded, and may comprise composite materials. Which may be textured. The texture may be geometrically configured such that compressive deformation will deform the elements (e.g. the ridges and/or the pad) to optimise the reactive nature of the composite. For example, this is particularly advantageous in examples where the pad may comprise closed cell foam. The pad and/or the ridges may, if desired, be produced in such a way as to include regions or layers in which the ratio of dilatant within the composite material differs from that in other regions or layers.

Some embodiments of the disclosure will now be described, by way of example only with reference to the accompanying drawings, in which.

Figure 1:
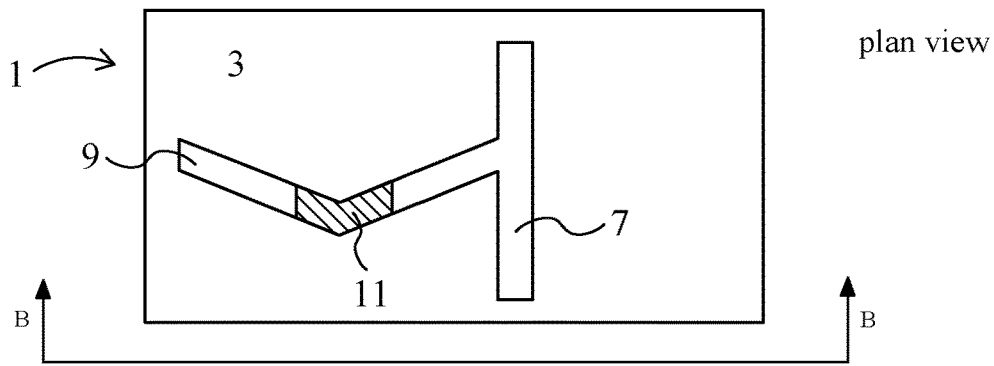
FIG. 1 shows a plan view and a side view of a flexible pad.
Figure 1:
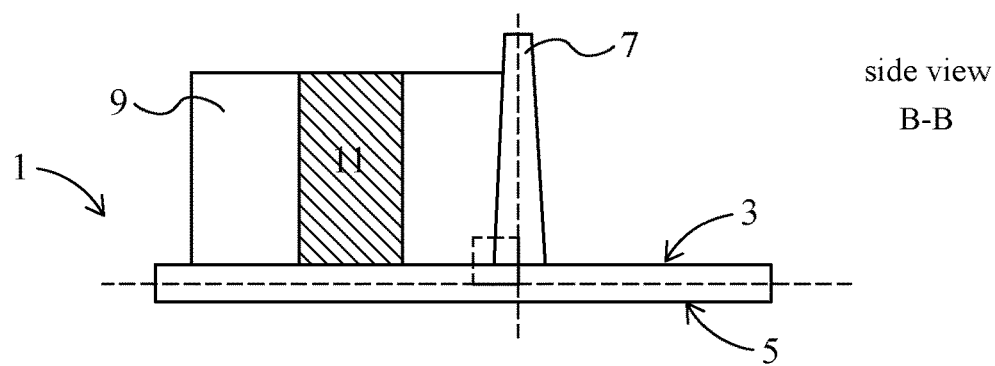
Figure 2:
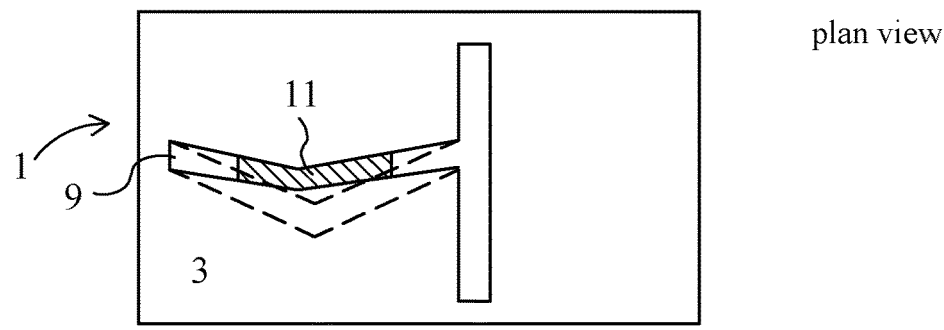
FIG. 2 shows a plan view and a side view of the pad of FIG. 1 when bent to be conformed to a curved shield.
Figure 2:
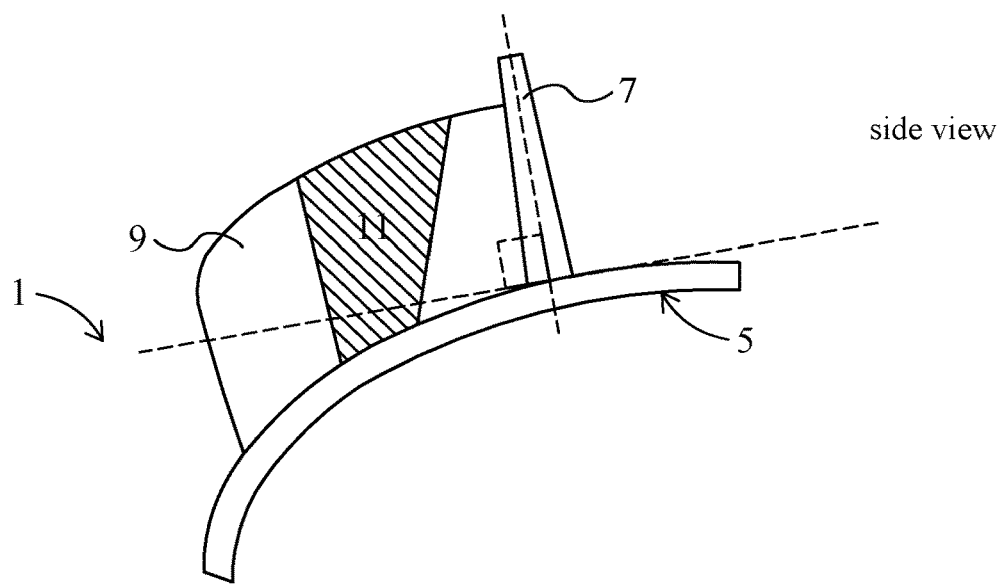
Figure 4:
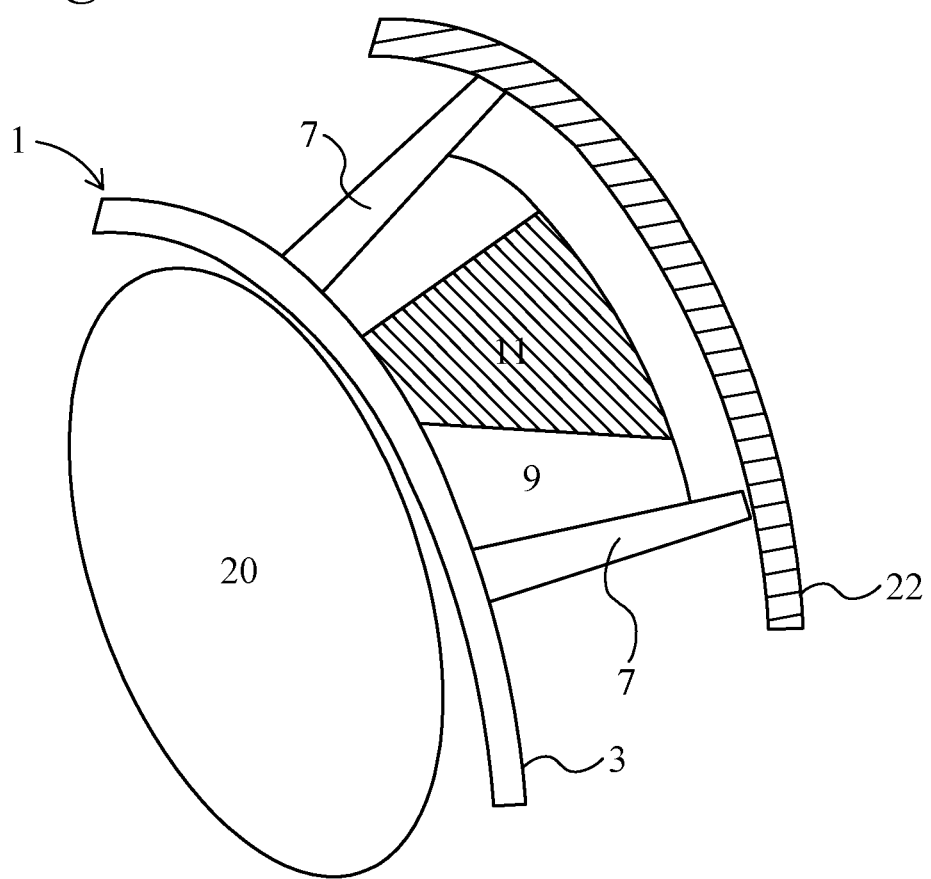
Figure 5A:
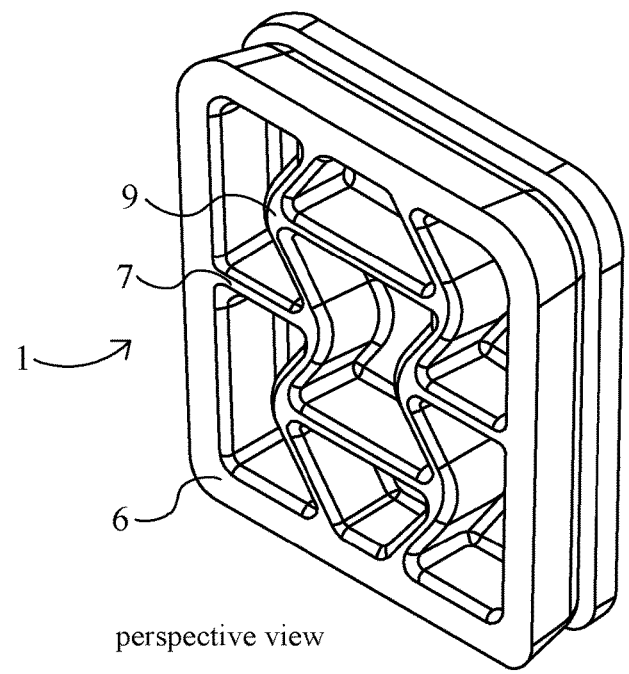
Figure 5B:
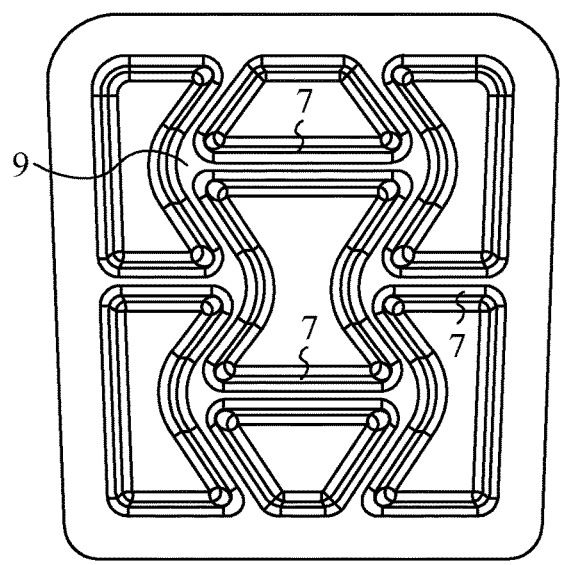
Figure 5C:
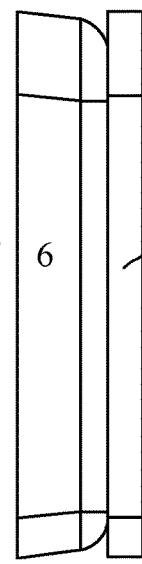

FIG. 3A, FIG. 3B, FIG. 3C, FIG. 3D, and FIG. 3E each show arrangements of ridges such as may be used in the pads of FIG. 1 or FIG. 2;

FIG. 4 shows a curved object separated from a shell by a pad;

FIG. 5A, FIG. 5B and FIG. 5C show perspective, plan and side views of a pad

Figure 6A:
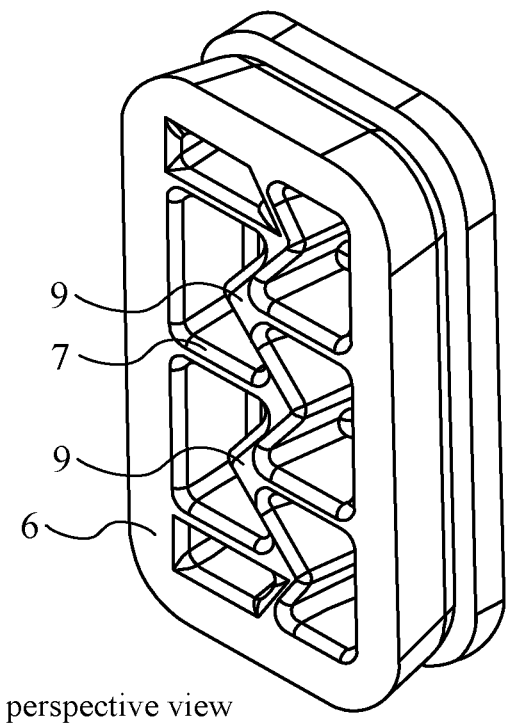
Figure 6B:
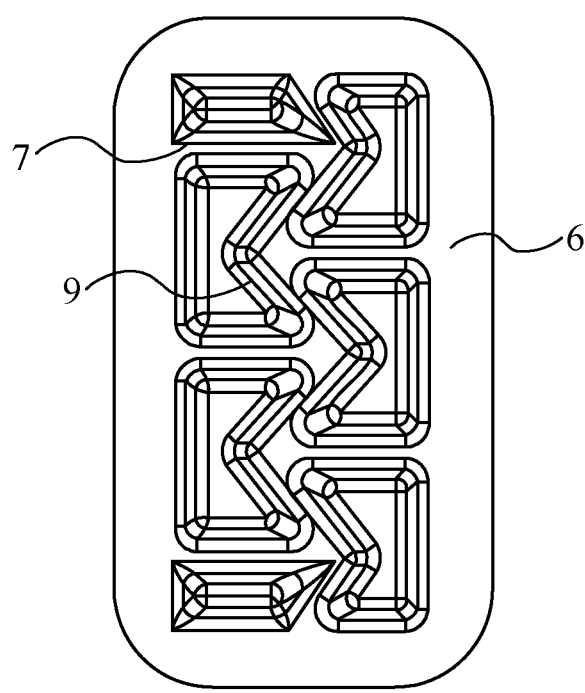
Figure 6C:
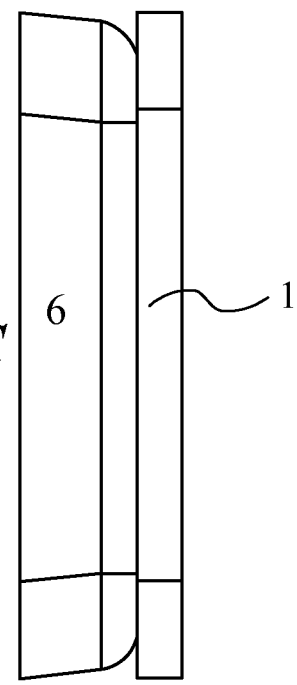
Figure 8:
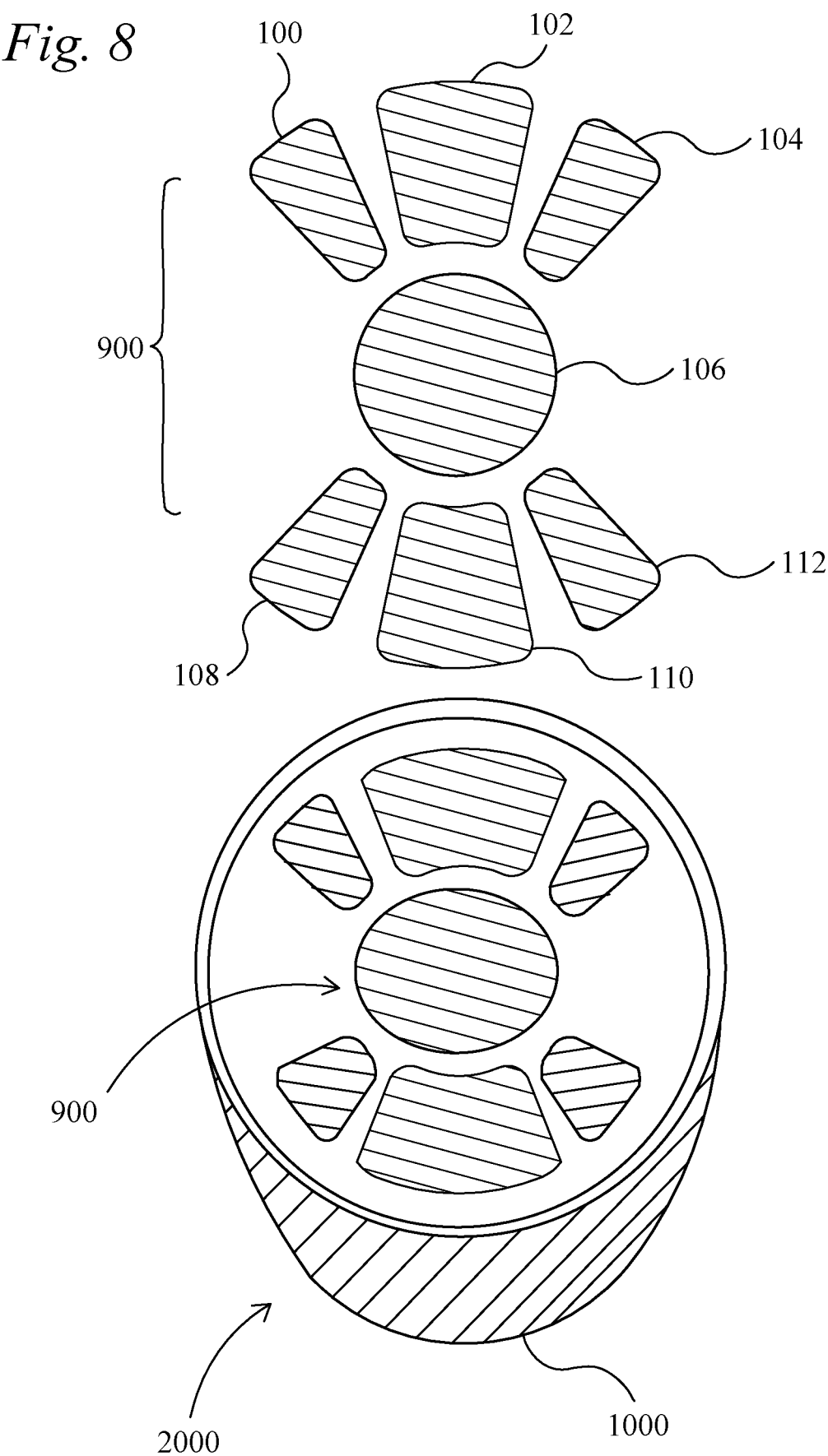

FIG. 6A, FIG. 6B and FIG. 6C show perspective, plan and side views of another pad;

FIG. 7 shows an example of a guide indicating an arrangement of a plurality of pads; and FIG. 8 illustrates a helmet comprising a plurality of pads.

Embodiments of the disclosure provide impact attenuation by separating a rigid shield from an object to be protected using a pad comprising ridges. It is helpful if the pads can be made, and transported, flat and then conformed to the shield when they are to be used. Embodiments of the disclosure assist impact attenuation by providing supported ridges that project at a selected angle from a pad, for example the ridges may be perpendicular to the pad, and/or to the surface of the shield which they are to space apart from the object. The provision of support for the ridges may risk placing unwanted stress on the ridges, or deflecting them from their desired alignment.

Accordingly embodiments of the disclosure provide a flexible pad comprising: a spacing ridge projecting at an angle (e.g. perpendicular) from a first major surface of the pad for providing a spacing between the first major surface and a shield shell. The pad also comprises a support ridge 9 projecting from the first major surface and extending transverse to the spacing ridge. The support ridge 9 comprises a flexure region 11, such as a bend, hinge or fold, adapted to unbend (e.g. to at least partially straighten) in the event that the pad is curved. This can inhibit strain in the support ridge 9 from causing deflection of the spacing ridge.

Shield systems such as helmets and limb protectors may comprise a plurality of pads, arranged between the object which is to be protected and the shield shell. The pads may be configured so that they align with the shield so that, when the shield is fitted to the object to be protected, the pads lie adjacent to selected regions of the object. For example, where the shield system comprises headgear such as a helmet, the pads may be arranged to lie against at least one of the crown, the temples, the sides, or the rear of the head. In another example, where the shield system comprises a limb protector the pads may be arranged to lie against at least one joint of the limb. For example a knee-protector may comprise a plurality of pads arranged to lie between the knee cap and the shield shell. For example, where the object is curved, the pads may be arranged transverse to the contours of the curved object, and the spacing ridges may be aligned with at least one contour of the object. The plurality of pads may be coupled together so that they can be installed into, and removed from, the shield together in a single operation.

FIG. 1 shows a plan view and a side view of a flexible pad 1.

The pad comprises a first major surface, and a second major surface 5. A spacing ridge lies along and projects from the first major surface 3. A support ridge 9 also lies along and projects from the first major surface 3. The support ridge 9 extends from the spacing ridge, transverse to the spacing ridge.

The spacing ridge projects at an angle from the first major surface 3 of the pad, so that the distal end of the spacing ridge 7 can support a shield spaced apart from the pad. The spacing ridge 7 is tapered so that the distal end of the spacing ridge 7 is narrower than its proximal portion, proximal to the first major surface 3 of the pad.

The support ridge 9 is arranged to support the spacing ridge 7. The support ridge 9 comprises a flexure region 11 (for example a bend, for example a turn, for example a fold) adapted to unbend in the event that the pad is curved about an axis aligned with the spacing ridge 7 to inhibit strain in the support ridge 9 from causing deflection of the spacing ridge 7.

Examples of the disclosure provide shield systems such as headgear (e.g. helmets) and limb protectors or object protectors, for example cases for electronic devices. In the case of limb protectors and object protectors the shield shell may be absent, for example a plurality of spacing and/or support ridges may be arranged in a lattice structure, for example in the form of a web for example a spider-web type construction, over the edges of an object to be protected such as a joint (e.g. knee, ankle, elbow, shoulder or wrist) or an electronic device such as a smartphone.

FIG. 2 shows an example of the pad of FIG. 1 in operation, bent about an axis aligned with the spacing ridge 7.

In operation, the flexure region 11 can unbend more in a distal portion of the flexure region 11, distal from the first major surface 3, than in a proximal portion proximal to the first major surface 3. As shown in FIG. 2, the unbending of the flexure region 11 relieves strain that would otherwise be placed, by the support ridge 9, on the spacing ridge 7. This unbending permits the support ridge 9 to at least partially straighten and inhibits strain in the support ridge 9 from causing deflection of the spacing ridge 7. Accordingly, the alignment of the spacing ridge 7 with respect to the pad can be maintained when the pad itself is bent to conform it to a curved shield such as a helmet.

The pad and ridges may comprise a common material, for example they may be integral with one another. For example they may be formed in a mould, and may be formed from a rate-sensitive material which optionally comprises a dilatant.

The spacing ridge 7 is shown in FIG. 1 and FIG. 2 as projecting perpendicular to the first major surface 3 of the pad. Being perpendicular may comprise being at an angle of about 90°, for example between 80° and 100° to the pad. This may assist impact attenuation, however in some examples the spacing ridge 7 may project at other angles from the pad. The ability to maintain the angle (whatever that angle might be) between the pad and the spacing ridge 7 enables control of the impact attenuation properties of the ridged pad.

The spacing ridge 7 of FIG. 1 and FIG. 2 is tapered so that the distal end of the spacing ridge 7 is narrower than its proximal portion, proximal to the first major surface 3 of the pad. However, this tapering is optional, and in some embodiments the ridges are not tapered. The illustration of FIG. 1 shows the distal extent of the support ridge 9 from the pad as being less than that of the spacing ridge 7. However in some implementations the support ridge 9 and the spacing ridge 7 are the same height so that both the spacing ridge 7 and the support ridge 9 may act to space a shield away from the pad.

The support ridge 9 comprises a flexure region 11. Examples of flexures include bends, turns, corners folds and hinges. The flexure region 11 need not in fact be bent provided that, in the event that the pad is curved about an axis aligned with the spacing ridge 7, it enables the support ridge 9 to extend to inhibit strain in the support ridge 9 from causing deflection of the spacing ridge 7.

The support ridge 9 is arranged to support the spacing ridge 7, but as will be appreciated, the spacing ridge 7 may also support the support ridge 9. The spacing ridge 7 may also comprise a flexure region 11. As will be explained in more detail below, in some embodiments a plurality of spacing ridges 7 and/or support ridges 9 are arranged together in a lattice, which may have an auxetic geometry. The ridges of the pad may be arranged to define at least one cell of a lattice having an auxetic geometry.

Examples of some possible arrangements of spacing ridges 7 and support ridges 9 are shown in plan views in FIG. 3A, FIG. 3B, FIG. 3C, FIG. 3D, and FIG. 3E. The pads and ridges of FIG. 3A to 3E have the features described above with reference to FIG. 1 and FIG. 2. The pads shown in FIG. 3A to FIG. 3E also comprise a boundary ridge that surrounds the first major surface 3 of the pad.

Figure 3A:
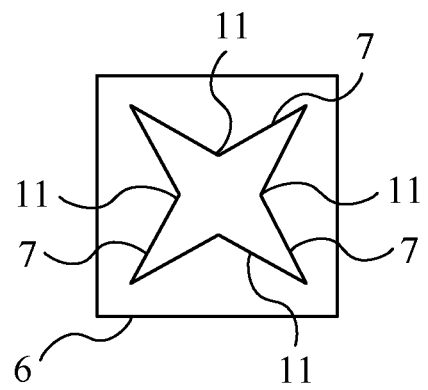

The pad shown in FIG. 3A comprises four ridges 7. Each of the four ridges 7 comprises a flexure region 11 so that, in their relaxed state, the ridges 7 are not straight. The ridges are coupled together at their ends to define a closed shape having the form of a four pointed star.

In operation, curving the pad of FIG. 3A about an axis that is at least partially aligned with any of the ridges 7 causes the flexure region 11 of at least one of the other ridges 7 to unbend. As one or more of the ridges unbend, the closed shape defined by the distal ends of the ridges expands, and becomes closer to a rectangle in shape. Accordingly, the shape defined by the distal ends of the ridges differs in both shape and surface area from the closed shape defined by the proximal portion of the ridges on the first major surface 3 of the pad.

Figure 3B:
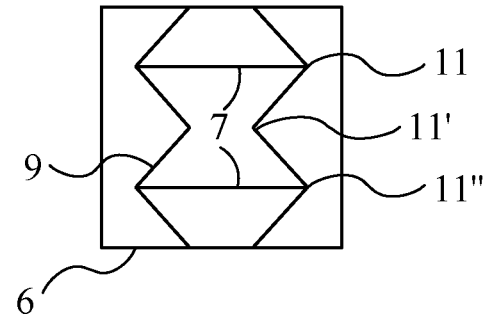

The pad shown in FIG. 3B comprises two support ridges 9 each comprising three flexure region 11s, and two spacing ridges 7. The support ridges 9 are aligned with each other. The spacing ridges 7 are transverse to the support ridges 9 and aligned with each other.

The support ridges 9 extend across the first major surface 3 of the pad from the boundary ridge on one side of the pad, to the boundary ridge on the other side of the pad. A first spacing ridge extends from a first flexure region 11 of a first support ridge 9', to a first flexure region 11 of a second support ridge 9". A second spacing ridge extends transverse to the support ridges 9 from a second flexure region 11" of the first support ridge, to a second flexure region 11" of the second support ridge. Each support ridge comprises a third flexure region 11' that couples the first and second flexure regions 11, 11" of that ridge together. The support ridges 9 are concertinaed, for example the third flexure region 11 is adapted to unbend in a different direction to the first and second flexure regions 11, 11" of the ridge.

In operation, when the pad of FIG. 3B is curved about an axis that is aligned with the spacing ridges 7, at least one of the first, second or third flexure region 11s of at least one of the first or second support ridges 9 unbend. The flexure region 11s can unbend independently of each other and can unbend more in a distal portion of the flexure region 11, distal from the first major surface 3, than in a proximal portion proximal to the first major surface 3.

Figure 3C:
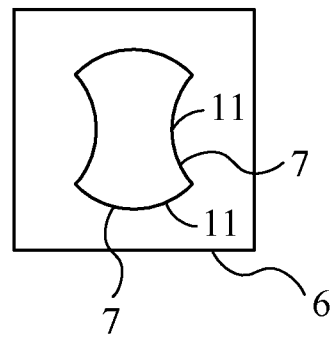

FIG. 3C illustrates an example in which four ridges are coupled together at their ends. Each of the four ridges comprises a flexure region 11 between its ends. A first two of the ridges are aligned, and the flexure region 11s of these ridges bend inward toward the other. A second two of the ridges are aligned with each other, and transverse to the first two ridges so that the ridges together define a four sided shape. The flexure regions of each of the second two ridges bend outward away from the other.

Figure 3D:
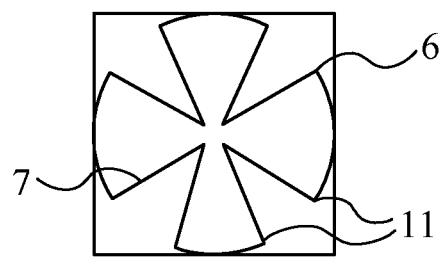
Figure 3E:
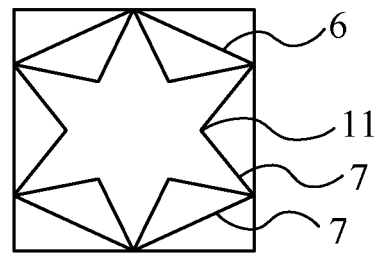

In operation, when the pad of FIG. 3C is curved the first two ridges, and/or the second two ridges can partially unbend depending upon the direction of the curvature The examples of both FIG. 3A and FIG. 3C enable the pad to be curved in more than one direction. As will be appreciated, by the arrangement of ridges having other geometries curvature of the pad about more than one axis of curvature can be provided whilst enabling the strain placed on ridges by the ridges that support them to be controlled or mitigated so that the angle of the ridges with respect to the pad can be controlled. Examples of ridge geometry having these properties are shown in FIG. 3D and FIG. 3E.

FIG. 4 shows a section view of a shield system for protecting an object 20 having a curved surface.

The shield is configured to surround a part of the curved surface of the object 20 and comprises a curved shell 22 and at least one pad such as that described with reference to any of FIGS. 1 to 3D, FIG. 5 or FIG. 6.

The pad is arranged on an interior surface of the shell 22 with the ridges of the pad facing toward the shell 22. The pad shown in FIG. 4 comprises two spacing ridges 7 coupled together by a support ridge. The pad, and the ridges carried on the pad, spaces the shell 22 from the object 20. The pad has a first major surface 3 that faces towards the object 20, and a second major surface 5, separated radially from the first major surface 3, that faces towards the shell 22.

The shell 22 may comprise a rigid material. The shell 22 has a radius of curvature selected to enable the shell 22 to surround at least part of the curved object 20. The rigidity of the shell 22 is selected to spread the force of an impact on the shell 22, thereby reducing the pressure associated with it, to shield the object 20 from being pierced or dented. The pad is compressible, so that in the event of an impact on the shell 22, deformation of the pad reduces the acceleration that would otherwise be experienced by the object 20. The ridges on the pad act to attenuate the force of impacts to protect the curved object 20. As will be appreciated, because the angle of the ridges with respect to the pad can be controlled, so to can the angle of the ridges with respect to the shield shell 22. It will be appreciated that the shell is optional, but may be particularly useful in embodiments relating to headgear. Some limb protectors may also use a shell. The shell may be flexible, for example resilient. In some examples the shell may comprise a web, and may comprise one or more textiles and/or polymers.

The curved object 20 may be a head, or a limb of a wearer, and the shield may be configured to provide a limb protector or headgear such as a helmet. The pad may be encapsulated. For example at least one of the first and second major surfaces 3, 5 of the pad may be coupled to a second pad of material, such as a comfort pad which may comprise an absorbent or moisture wicking material. Tapering the cross section of the ridges in this way is one way to arrange the spacer to assist impact attenuation, for example it may reduce mechanical coupling between the shell 22 and the pad, it may also permit the ridge to attenuate impact by collapsing gradually, for example in stages.

A guide may be provided with the shell 22, for example in the form of a template or a set of instructions, to guide an operator to align the pad with respect to the shield so that the support ridge is aligned with the direction of curvature, and the spacing ridge is aligned with a contour of the shield. The guide may comprise a fabric material, such as a webbing shaped to correspond to the shape of the shield and having one or more aligners adapted to align at least one pad based on the curvature of the shield. For example the aligners may be configured to align the ridge of the pad with at least one of contour of a shield shell 22.

FIG. 5A shows a perspective view of a pad 1 comprising a boundary ridge 6 that surrounds an edge of the first major surface of the pad. A plurality of spacing ridges 7 are coupled between either (a) at least two support ridges or (b) at least one support ridge and the boundary ridge 6. FIG. 5B shows a plan view of the pad 1 of FIG. 5A. FIG. 5C shows a side view of the pad of FIG. 5A.

FIG. 6A shows a perspective view of another pad 1 comprising a boundary ridge 6 that surrounds an edge of the first major surface of the pad. A plurality of spacing ridges 7 are coupled between a support ridge 9 and the boundary ridge 6. FIG. 6B shows a plan view of the pad 1 of FIG. 6A. FIG. 6C shows a side view of the pad of FIG. 6A.

FIG. 7 shows an example of an arrangement of a plurality of pads. Pads, or aligners for receiving pads 100, 102, 104, 106108, 110, 112, may be arranged to align pads with respect to anatomical regions of a wearer's head. The pads and/or aligners may be coupled together by at least one flexible member (not shown), such as a flexible arm, webbing or fabric, to enable the pads to be positioned together into a shield shell.

The pads and or aligners may be of any shape. For example, they may be hexagonal or round or any combination of shapes.

Pads according to those described above may be coupled (for example bonded or fixed) between an inner liner adapted to lie between the second major surface 5 of the pad and the object 20 to be shielded, and an outer liner adapted to lie between the ridges of the pad and a shield shell 22. The outer liner may comprise fixtures for coupling the pad to the shield shell 22. The shell 22 may comprise complementary fixtures for engaging with the fixtures of the pad to hold the pad in place. The fixtures may be keyed, or otherwise configured to enable the pad to be coupled in a selected orientation (for example with at least some of the pad's ridges aligned with a contour of the shell 22) and to inhibit the pad from being coupled in other orientations. The outer liner may be elasticated to inhibit displacement of the outer liner from causing deflection of the ridges. In an embodiment the outer liner is coupled to the boundary ridge of the pad but not to the spacing ridges 7.

The inner liner may further comprise an outer lining so as to provide comfort to the wearer of the helmet. Suitable materials include lightweight synthetic foams and/or fabrics. It will be appreciated that such materials are intended to be skin comfortable and may also aid in dissipation of perspiration and/or heat. The inner liner may optionally be provided with holes and/or vents so as to aid in the dissipation of perspiration and/or heat.

The inner liner may be adapted or adaptable to the shape of a user's head. Suitably, the inner liner forms a substantially continuous inner surface of the helmet and is adapted to cover the head of the user to such an extent as is usual for helmets of the selected type.

Other examples and variations will be apparent to the skilled addressee in the context of the present disclosure.

Shield systems such as helmets and limb protectors may comprise a plurality of pads, arranged between the object which is to be protected and the shield shell. The pads may be configured so that they align with the shield so that, when the shield is fitted to the object to be protected, the pads lie adjacent to selected regions of the object. For example, where the shield system comprises headgear such as a helmet, the pads may be arranged to lie against at least one of the crown, the temples, the sides, or the rear of the head. In another example, where the shield system comprises a limb protector the pads may be arranged to lie against at least one joint of the limb. For example a knee-protector may comprise a plurality of pads arranged to lie between the knee cap and the shield shell. For example, where the object is curved, the pads may be arranged transverse to the contours of the curved object, and the spacing ridges may be aligned with at least one contour of the object. The plurality of pads may be coupled together so that they can be installed into, and removed from, the shield together in a single operation. In some examples of a kneepad the shell may be flexible and may comprise a textile, such as an anti-abrasive textile. In some examples a kneepad may be provided without a shell. In some examples a ballistic kneepad may be provided, for example the shell may comprise a composite armour shell which may be abrasion resistant, for example it may comprise an abrasion resistant coating In some examples, a system of pads may comprise a plurality of pads, and a shield shell adapted to fit an object to be protected to align the shell and the object. For example, the shell may fit the object so that selected regions of the shell align with corresponding selected regions of the object. The shell maybe adapted to inhibit the shield from being misaligned with the object. For example the shield system may be adapted to protect a part of a wearer's body, and to fit that part of the body only in one or more selected arrangements.

In this selected arrangement, a first pad may be arranged to lie between a first anatomical region and a corresponding first region of the shield shell. A second pad is arranged to lie between a second anatomical region and a corresponding second region of the shield shell. A third pad is arranged to lie between a third anatomical region and a corresponding third region of the shield shell. At least one of the first second and third pads may configured, for example by being shaped, to inhibit the pads from being fitted to the shield unless at least one of the first, second and third pads is aligned with the corresponding one of the first second and third regions of the shield shell.

FIG. 8 shows some examples of configurations of helmets, and illustrates the use of guides, templates or sets of coupled pads 900 such as those illustrated in FIG. 7. In FIG. 8 a helmet system 2000 comprises a shell 1000 and a plurality of pads 900 which may be coupled together, for example by at least one flexible member. As illustrated a first pad 110 is arranged to lie between the forehead and a corresponding forehead region of the helmet shell. A second pad 108 is arranged to lie between the left temple and a corresponding temple region of the helmet shell. A third pad 102 is arranged to lie between the rear of the head and a corresponding region of the helmet shell. At least one of the first second and third pads may configured, for example by being shaped, to inhibit the pads from being fitted to the helmet unless at least one of the first, second and third pads is aligned with the corresponding one of the first second and third regions of the helmet shell. In some examples the pads may be coupled together by flexible arms arranged to position the pads adjacent to selected anatomical regions when the pad is conformed to the shield.

The selected anatomical regions may be regions of the head which may be selected from the list comprising:
front/forehead
left and right front boss (which may be about 45° from the front)
left and right sides/temples
top/crown
rear/back
left and right rear nape Although the examples shown in FIGS. 7 to 10 relate to helmet systems it will be appreciated that the same principles may be applied to shields for other parts of a wearer's body.

In some examples the shield system may be adapted to protect other objects, for example the shield system may be incorporated into a protective case for an object such as an electronic device, for example a handheld electronic device. For example, the shield system may be adapted to fit the object to be protected to align the system with respect to the object so selected regions of the shield system align with corresponding selected regions of the object. For example the shield system may be adapted to align with protuberances, for example corners or edges, of the object to be protected, The shield system may comprise a pad adapted to conform to at least one selected region of an object to be protected, for example a pad adapted to conform to a protuberance of the object, for example a corner or edge of an electronic device. The pad of the shield system may be configured so that when the shield system is fitted to the object the pad is arranged to lie adjacent to the at least one selected region of the object. In some examples, when the shield system is fitted to the object the pad is adapted to lie against the at least one region of the object to be protected, without the need of having a shield shell.

In some examples the shield system may have a plurality of pads, for example the shield system may be adapted to have a pad for each corner of the object to be protected.

In some examples the object to be protected comprises the shield system, for example the housing of the object comprises the shield system, for example so that the shield system is integral with the object. In some examples the pad may be incorporated into the object to be protected, for example such that a housing of the object comprises the pad, for example so that the pad is integral with the object.

In some examples a pad is not required. For example, the shield system may comprise at least one surface (for example of the housing and/or of the object to be protected itself) and a spacing ridge projecting at an angle from the surface. This shield system further comprises a support ridge projecting from the surface and extending transverse to the spacing ridge. The support ridge comprises a flexure region adapted to unbend in the event that the surface is curved about an axis aligned with the spacing ridge to inhibit strain in the support ridge from causing deflection of the spacing ridge. The spacing ridge and/or the support ridge may comprise flexible material, for example resilient material. The shield system may be configured so that the support ridge is aligned with a direction of curvature of the object, for example a protuberance such as a corner, and the spacing ridge is aligned with a contour of the shield shell.

The spacing ridge and/or the support ridge may project from an interior or exterior face of the surface. For example, the spacing ridge and/or support ridge may project towards the object to be protected or away from the object to be protected. For example the spacing ridge may be adapted to provide a spacing between the surface and a shield shell.

In some examples shield systems of the disclosure do not include a shield shell. For example the ridges themselves may shield the object. For example, the ridges that form the structure may be orthogonal to a surface of the object.

In examples where the spacing ridge and support ridge project from an exterior face of the surface away from the object to be protected, the surface may comprise a curved surface, such as the surface of a protuberance, for example a corner, of the object. The surface may be arranged to lie adjacent to at least one selected region of the object. In some examples, when the shield system is fitted to the object the surface is adapted to lie against the at least one region of the object to be protected. In some examples the surface may be the housing or encapsulation of the object, and the selected region may be a corner or edge of the housing or encapsulation of the object.

The spacing ridges may support the shield shell spaced from the object. In some examples, the shield shell may comprise a protective case, for example the shield shell may comprise a removable protective case. However, in some examples, the shield system does not require a shield shell, for example when the spacing and support ridges project from an interior face of the surface towards the object. In this example we do not require the shield shell because the shell is already there, for example in the form of a housing (e.g. encapsulation, e.g. a case) of an object.

In examples where the spacing ridge and support ridge project from an interior face of the surface towards the object to be protected, the surface may form part of a case, for example the case may comprise the surface such that the case comprises the spacing ridges(a) and/or support ridge(s). The case may comprise a resilient shell. The surface may be curved to align with the object to be protected, for example so that the surface matches or closely follows a curvature of the object to be protected.

In some examples, the shield system is adapted to encapsulate an object, for example to protect any internal components of the object. For example, in some examples the shield system is adapted to encapsulate and/or protect an electronic device, for example a handheld device, for example a smartphone and/or tablet device and protect it from accidental damage due to dropping. In these examples the shield system may be adapted to fit the electronic device to protect the electronic device, for example the shield system may be a protective case to fit around the electronic device. Cases may comprise sleeves or bands for example a bumper arranged to protect part of a device such as its edges or corners. In some examples the case may comprise a protective enclosure. The case may be flexible, for example resilient and/or elastic. The case may be rigid.

For example, a case may comprise the shield system. The case is adapted to fit around a handheld device, and comprises an aperture, for example for accessing a touch screen. The shield system is adapted to curve around the surfaces of the handheld device. The surfaces of the handheld device may comprise the edges and corners of the handheld device. The case comprises a pad for each surface of the handheld device, such that the pad is adapted to conform to each surface of the handheld device. For example, the case is adapted to conform to each corner and/or edge of the handheld device, and may comprise a pad for each corner and/or edge of the handheld device. Each pad is adapted to lie adjacent to and against a surface of the handheld device when fitted to the handheld device. The support ridge of the shield system for each pad is adapted to align with a direction of curvature of each surface, and the spacing ridge of each pad is aligned with a contour of the shield shell. The shield shell forms the outer surface for the case and is configured to withstand impact e.g. due to dropping. Therefore the outer surface of the case comprises the shield shell.

As will be appreciated by the skilled reader in the context of the present disclosure, each of the examples described herein may be implemented in a variety of different ways. Any feature of any aspects of the disclosure may be combined with any of the other aspects of the disclosure. For example method aspects may be combined with apparatus aspects, and features described with reference to the operation of particular elements of apparatus may be provided in methods which do not use those particular types of apparatus. In addition, each of the features of each of the embodiments is intended to be separable from the features which it is described in combination with, unless it is expressly stated that some other feature is essential to its operation. Each of these separable features may of course be combined with any of the other features of the embodiment in which it is described, or with any of the other features or combination of features of any of the other embodiments described herein. Apparatus of the disclosure, such as shield systems, for example cases for protecting objects, and objects themselves comprising ridges as defined herein may be provided with or without shield shells and may be provided with or without pads.

Any aspect of the shield system may be manufactured by way of '3D printing' whereby a three-dimensional model of any aspect of the shield system is supplied, in machine readable form, to a '3D printer' adapted to manufacture any aspect of the shield system. This may be by additive means such as extrusion deposition, Electron Beam Freeform Fabrication (EBF), granular materials binding, lamination, photopolymerization, or stereolithography or a combination thereof. The machine readable model comprises a spatial map of the object to be printed, typically in the form of a Cartesian coordinate system defining the object's surfaces. This spatial map may comprise a computer file which may be provided in any one of a number of file conventions. One example of a file convention is a STL (STereoLithography) file which may be in the form of ASCII (American Standard Code for Information Interchange) or binary and specifies areas by way of triangulated surfaces with defined normals and vertices. An alternative file format is AMF (Additive Manufacturing File) which provides the facility to specify the material and texture of each surface as well as allowing for curved triangulated surfaces. The mapping of any aspect of the shield system may then be converted into instructions to be executed by 3D printer according to the printing method being used. This may comprise splitting the model into slices (for example, each slice corresponding to an x-y plane, with successive layers building the z dimension) and encoding each slice into a series of instructions. The instructions sent to the 3D printer may comprise Numerical Control (NC) or Computer NC (CNC) instructions, preferably in the form of G-code (also called RS-274), which comprises a series of instructions regarding how the 3D printer should act. The instructions vary depending on the type of 3D printer being used, but in the example of a moving printhead the instructions include: how the printhead should move, when/where to deposit material, the type of material to be deposited, and the flow rate of the deposited material.

The shield system as described herein may be embodied in one such machine readable model, for example a machine readable map or instructions, for example to enable a physical representation of said shield system to be produced by 3D printing. This may be in the form of a software code mapping of the shield system and/or instructions to be supplied to a 3D printer (for example numerical code).

Other examples and variations are contemplated within the scope of the appended 5 claims.

The invention claimed is:

1. An energy absorbing helmet liner, the liner comprising at least one flexible pad comprising: first and second spacing ridges projecting at an angle from a first major surface of the pad for providing a spacing between the first major surface and a helmet; a first support ridge projecting from the first major surface and extending transverse to the first spacing ridge and a second support ridge projecting from the first major surface and extending transverse to the first spacing ridge, wherein the support ridges each comprise a flexure region adapted to unbend in the event that the pad is curved about an axis aligned with a spacing ridge to inhibit strain in a support ridge from causing deflection of a spacing ridge; wherein the first and second spacing ridges are tapered so that a distal end of the spacing ridge is narrower than a proximal portion, proximal to the first major surface of the pad; and wherein the first and second support ridges and the first and second spacing ridges are arranged to define at least one cell of a lattice having an auxetic geometry.

2. The helmet liner of claim 1, wherein the flexure region is operable to unbend more in the distal end of the flexure region, distal from the first major surface, than in the proximal portion proximal to the first major surface.

3. The helmet liner of claim 1, wherein the flexure region is configured so that unbending of the flexure region causes the support ridge to at least partially straighten.

4. The helmet liner of claim 1, wherein a spacing ridge comprises a flexure region adapted to unbend in the event that the pad is curved about an axis aligned with the support ridge to inhibit strain in the support ridge from causing deflection of the support ridge.

5. The helmet liner of claim 1, wherein the flexure region is arranged to enable ridge displacement that increases with distance from the first major surface.

6. The helmet liner of claim 1, wherein at least one of a support ridge and a spacing ridge are arranged to define a meandering or concertinaed path across the first major surface of the pad.

7. The helmet liner of claim 1, wherein the spacing ridges and support ridges are integrally formed with the pad.

8. The helmet liner of claim 1, further comprising a helmet.

9. The helmet liner of claim 8, wherein the helmet liner comprises a guide configured to align the pad with respect to the helmet so that a support ridge is aligned with the direction of curvature, and a spacing ridge is aligned with a contour of the helmet.

10. The helmet liner of claim 1, comprising a plurality of pads.

11. The helmet liner of claim 8, wherein the helmet is adapted to fit an object to be protected to align the helmet with respect to the object so selected regions of the helmet align with corresponding selected regions of the object.

12. The helmet liner of claim 11, comprising at least two pads, coupled together, and adapted to fit into the helmet so the pads are arranged adjacent two spatially separated regions of the object.

13. The helmet liner of claim 1, wherein the ridges lie along the first major surface of the pad.

14. An energy absorbing helmet liner, the liner comprising at least one flexible pad comprising:
  first and second spacing ridges projecting at an angle from a first major surface of the pad for providing a spacing between the first major surface and a helmet;
  a first support ridge projecting from the first major surface and extending transverse to the first spacing ridge and a second support ridge projecting from the first major surface and extending transverse to the first spacing ridge, the height of the first and second support ridges from the first major surface of the pad being less than the height of the first and second spacing ridges from the first major surface of the pad;
  wherein the support ridges each comprise a flexure region adapted to unbend in the event that the pad is curved about an axis aligned with a spacing ridge to inhibit strain in a support ridge from causing deflection of a spacing ridge; and
  wherein the first and second support ridges and the first and second spacing ridges are arranged to define at least one cell of a lattice having an auxetic geometry.

* * * * *

UNITED STATES PATENT AND TRADEMARK OFFICE
CERTIFICATE OF CORRECTION

PATENT NO. : 11,206,812 B2
APPLICATION NO. : 14/912803
DATED : December 28, 2021
INVENTOR(S) : James Fyfe and Mark Muenchinger Page 1 of 1

It is certified that error appears in the above-identified patent and that said Letters Patent is hereby corrected as shown below:

On the Title Page

Column 1, Line 30:
"Foreign Application Priority Data: Sept. 28, 2013 (GB)...................1317225"
Should read:
--Foreign Application Priority Data: Sept. 28, 2013 (GB)...................1317225.9--

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*